(12) United States Patent
Ricciulli

(10) Patent No.: US 7,331,060 B1
(45) Date of Patent: Feb. 12, 2008

(54) DYNAMIC DOS FLOODING PROTECTION

(75) Inventor: Livio Ricciulli, Los Gatos, CA (US)

(73) Assignee: Xangati, Inc., Cupertino, CA (US)

( * ) Notice: Subject to any disclaimer, the term of this patent is extended or adjusted under 35 U.S.C. 154(b) by 786 days.

(21) Appl. No.: 10/242,380

(22) Filed: Sep. 10, 2002

Related U.S. Application Data

(60) Provisional application No. 60/318,670, filed on Sep. 10, 2001.

(51) Int. Cl.
*G06F 11/00* (2006.01)

(52) U.S. Cl. .................... 726/22; 726/23; 726/24; 726/13; 709/227

(58) Field of Classification Search ........... 709/232, 709/238, 234–235, 223–226, 227; 370/229–230, 370/230.1, 235; 726/3, 22–24, 13; 713/160
See application file for complete search history.

(56) References Cited

U.S. PATENT DOCUMENTS

| | | | |
|---|---|---|---|
| 5,128,871 A | | 7/1992 | Schmitz |
| 5,233,604 A | | 8/1993 | Ahmadi et al. |
| 5,442,750 A | | 8/1995 | Harriman et al. |
| 5,970,064 A | | 10/1999 | Clark et al. |
| 6,046,979 A | * | 4/2000 | Bauman ............... 370/229 |
| 6,076,115 A | * | 6/2000 | Sambamurthy et al. ..... 709/250 |
| 6,115,745 A | | 9/2000 | Berstis et al. |
| 6,167,025 A | | 12/2000 | Hsing et al. |
| 6,189,035 B1 | * | 2/2001 | Lockhart et al. ........... 709/229 |
| 6,202,084 B1 | | 3/2001 | Kumar et al. |
| 6,314,093 B1 | | 11/2001 | Mann et al. |
| 6,314,464 B1 | | 11/2001 | Murata et al. |
| 6,347,339 B1 | | 2/2002 | Morris et al. |
| 6,789,190 B1 | * | 9/2004 | Cohen ..................... 713/160 |
| 6,816,910 B1 | | 11/2004 | Ricciulli |
| 6,930,978 B2 | * | 8/2005 | Sharp et al. ............... 370/229 |
| 6,973,040 B1 | | 12/2005 | Ricciulli |
| 7,013,482 B1 | * | 3/2006 | Krumel .................... 726/13 |

OTHER PUBLICATIONS

S. Deering et al, "RFC1883", Internet Protocol, Version 6 (IPv6) Specification (available at URL of http://www.faqs./org/rfcs/rfc1883.html), pp. 1-27, Dec. 1995.

Steinke, S., "IP Addresses and Subnet Masks", Network Magazine, Oct. 1995 (available at URL of http://www.networkmagazine.com/shared/printableArticle.jhtml?articleID=17601068), pp. 1-3 and Table 1 and Table 3.

* cited by examiner

Primary Examiner—T. B. Truong
(74) Attorney, Agent, or Firm—Swernofsky Law Group PC

(57) ABSTRACT

Detecting and protecting against denial of service flooding attacks that are initiated against an end system on a computer network. In accordance with one aspect of the invention, a filter is established at a network location. The filter prevents data packets received at a first network location and deemed responsible for the denial of service flooding condition from being forwarded to a subsequent network location. Data packets received at the first network location are then monitored to determine whether the flow of any data packets from a network source exhibit a legitimate behavior, such as where the flow of data packets exhibits a backoff behavior. The filter is then modified to permit data packets that exhibit legitimate behavior to pass through the filter.

15 Claims, 11 Drawing Sheets

DYNAMIC DOS FLOODING PROTECTION

REFERENCE TO PRIORITY APPLICATION

This application claims priority of co-pending U.S. Provisional Patent Application Ser. No. 60/318,670 entitled "Dynamic DoS Flooding Protection" to L. Ricciulli, filed Sep. 10, 2001. Priority of the filing date of Sep. 10, 2001 is hereby claimed, and the disclosure of said Provisional Patent Application is hereby incorporated by reference in its entirety.

BACKGROUND OF THE INVENTION

1. Field of the Invention

This invention relates generally to network denial of service attacks and, more particularly, to protecting against network denial of service flooding attacks.

2. Description of the Related Art

Society has become increasingly dependent on the Internet for daily activities as a result of the exponential growth of both government and business processes that make use of Internet technologies. The Internet's explosive growth is at least partially due to the scalability and fault-tolerance of its design principle, which pushes most of the complexity and state out toward the edges of the network, thereby making the network nodes relatively simple and easy to manage.

This simplicity, and a lack of built-in authentication, makes the Internet scalable and easy to manage but also very anonymous, as the configuration of the Internet makes it somewhat difficult to trace the source of transmitted packets. This has enabled the insurgence of network-based denial of service (DoS) attacks, in which packets are sent remotely and anonymously through the Internet with the goal of shutting down or greatly inhibiting a targeted end system from providing services over the Internet. The packets have adverse effects on the communication resources of targeted end-systems, thereby denying access to legitimate users that try to access the end systems.

Network-based DoS attacks can be generally classified in three categories: (1) implementation exploits; (2) protocol exploits; and (3) flooding exploits. Implementation exploits are DoS attacks that adversely take advantage of known deficiencies of certain implementations from specific end-system vendors in order to disable an end-system. Such implementation exploits are generally the least severe since they can be easily defeated by patching the vendor's implementation to overcome or resist the attack.

Protocol exploits are DoS attacks that misuse specific communication protocols and take advantage of the fact that many protocols are not designed to protect against hostile use of the protocols. For example, TCP SYN attacks or routing attacks are examples of protocol exploits that involve sending an excess number of TCP SYN packets to a targeted end-system. These attacks are not very easy to devise but are very severe, as they require changes or amendments to standards and therefore may be very expensive to fix.

Flooding exploits simply send large amounts of bogus traffic to a victim's end-system in an attempt to entirely consume the traffic capacity of the end-system and thereby shut down the victim's ability to service legitimate traffic. These exploits expose the lack of resource management in Internet Protocol (IP) networks and are very popular because of their relative simplicity and destructive outcomes. DoS flooding is facilitated by the general lack of Internet quality of service (QOS) control that permits uncontrolled, malicious acquisition and use of Internet bandwidth. Furthermore, the lack of security allows such destructive usage to be carried out anonymously.

Currently, DoS flooding attacks often are implemented through the wide availability and usage of several distributed DoS (DDoS) tools that allow attackers to anonymously and remotely control a number of attack hosts ("zombies") that send floods of packets toward the victim(s) on a network or at an end-system. The DDoS tools send attack packets in an uncontrolled fashion to consume all or a large portion of the bandwidth at the victim's network. Furthermore, attacker anonymity is achieved by inserting random packet header fields into the attack packets to thereby misidentify the source of the packets. As a result, the offending traffic cannot be distinguished from the legitimate traffic and cannot be traced on the basis of the contents of the protocol headers.

The end result of these types of attacks is to anonymously prevent legitimate users from reaching the victim's network services. The attacks also subject the victim's network to crippling load conditions, as the network's replies to randomly generated source addresses flush route caches in routers and overload the route lookup mechanisms, which further aggravates the situation.

There are a variety of available DDoS tools for implementing DoS attacks. Such tools basically use three types of flooding packets: (1) TCP packets (such as SYN, ACK, RST, NULL); (2) ICMP packets; and (3) UDP packets. A new breed of attacks based on reflection are also being used. These types of attacks use a plurality of compromised zombie hosts to send TCP, UDP or ICMP packets with the source addresses in the packets set to the victim's network address. The zombies iteratively send the packets to a very large number of legitimate network endpoints. The network endpoints then reply to the packets, resulting in a flood of packets being sent to the victim's network address. The replies typically include SYN ACKs, ICMP echo replies, or any other application responses (such as a Gnutella connection request). Such techniques allow attacks to be much more distributed and also render any forensic techniques more difficult, as the zombies are only involved indirectly.

There are currently several existing techniques that attempt to mitigate the Internet DDoS flooding problem. With the exception of rate limiting, all these techniques decrease the anonymity of flooding packets in order to aid in identification and capture of the attackers responsible for the attack. However, the techniques do not prevent or alleviate the effectiveness of the actual flooding attack.

Rate limiting is one technique that reduces the effectiveness of DDoS attacks. According to this technique, rate-limiting filters are administratively applied at network locations to effectively reduce the amount of bandwidth consumed by certain types of packets at the network location in response to a detected rate of receiving packets. This limits the exposure to bandwidth attacks that use these types of packets. Unfortunately, most conventional DDoS attack methods spoof protocol headers in a way that is indistinguishable from legitimate production traffic (so that DDDoS packets appear to be legitimate HTTP traffic). Consequently, rate limiting of bandwidth for DDoS flood protection also limits the legitimate traffic.

Most firewalls today offer a rate-limiting functionality. However, a rate limiting functionality is only marginally useful as it does not provide any benefits against randomly spoofed bandwidth attacks. Furthermore, it does not prevent an attacker from consuming the bandwidth on the network side of the firewall. Consequently, rate limiting is only useful if it can be applied close to the source of the attack, where most of the traffic is malicious. However, rate limiting close to the victim's network through the use of firewalls or traffic shapers has two very undesirable consequences. One such consequence is that, during normal operations, rate limiting effectively reduces the capacity of the victim's network. Another consequence is that, in the presence of an attack, rate limiting lowers the bandwidth threshold necessary for an adversary to force the rate limited system to start dropping legitimate packets.

Ingress filtering is another technique for countering DoS attacks. Ingress filtering does not directly eliminate DDoS flooding attacks, but rather prevents spoofing of source addresses through the use of preventive administrative filtering at a network ingress point. Spoofing source addresses is one of the techniques used to hide the origin of flooding packets or to control packets that can cause flooding to occur, thus making DDoS safer to be carried out from the attacker perspective. Ingress filtering uses a router that checks to ensure that each packet sent into the Internet by an Internet Service Provider (ISP) has a source IP address that belongs to the administrative domain of the router performing the check.

If ingress filtering were universally applied, source addresses of flooding packets could be used to track down the sending ISP and eventually the attackers. However, in practice, ingress filtering is very difficult to promote and adopt universally, as it requires ISPs to dedicate router computing resources to check all outgoing routed packets, thereby reducing the effective throughput of the ISP. Consequently, ingress filtering is not a viable solution to DDoS flooding because it may only reduce the number of available launch platforms (excluding the ones that apply ingress filtering), thus providing only a partial solution. Furthermore, ingress filtering may reduce the occurrence of only certain attacks and may not deter DDoS attacks that are carried out with the collusion of the ISP, such as in international electronic warfare or electronic terrorism.

Packet marking is another technique for countering DoS attacks. Packet marking requires the modification of some packets as they are being forwarded by routers. Packet marking helps in reconstructing the origin of a flood and thus could be used to trace attackers. This technique has the same general limitations of ingress filtering, but may be more useful in the short term, as packet marking could be applied in a more controlled way to a given protection domain without requiring cooperation of the Internet community as a whole. Several marking schemes have been proposed to probabilistically overload certain fields in the IP headers to provide enough information to the victim to reconstruct the forwarding paths. This can be accomplished in various ways, such as to use the offset bits in a packet to encode the ID number of a router used to route the packet and thereby permit reconstruction of the sequence of routers through which the packet traveled.

One drawback of packet marking is that it requires some additional amount of computation in the routers, thereby consuming computation resources and limiting throughput. Furthermore, the victim's network (end-system) must perform a significant amount of computation to extract from the marked packets enough information to be able to identify the forwarding path. Another drawback is that large amounts of bogus markings can be injected into the packet stream to either confuse the detection algorithm or create a disabling DoS condition on the hosts performing the path computation.

Thus, there are currently a variety of ways of dealing with DoS flooding attacks, but each has its own drawbacks. Rate limiting does not effectively work against packets with randomly-spoofed source addresses and can also limit the performance of legitimate traffic. Ingress filtering requires the cooperation of one or more ISPs, which is not practical. Packet marking is computationally expensive from the standpoint of the protected network. In view of the foregoing, there is a need for an improved method and apparatus for effectively detecting and protecting against DoS flooding attacks on a computer network.

SUMMARY

Disclosed are devices and methods for detecting and protecting against DoS flooding attacks that are initiated against an end system on a computer network. In accordance with one aspect of the invention, a filter is established at a network location. The filter prevents data packets received at a first network location and deemed responsible for a DoS flooding condition from being forwarded to a subsequent network location. The flow of data packets received at the first network location is monitored to determine whether the flow of data packets exhibits a legitimate behavior, such that the flow of data packets that exhibit legitimate behavior is determined to originate from a legitimate source that is not responsible for the DoS flooding condition. Legitimate behavior can be characterized by the flow of data packets from a network source that exhibits backoff behavior. The filter is then modified to permit data packets that originate from the legitimate source to be forwarded from the first network location to a subsequent network location.

In another aspect of the invention, a DoS attack at a first network location is detected and an alarm signal is transmitted to a second network location in response to determining that the denial of service flooding condition is present at the first network location. The alarm signal identifies at least one characteristic of a data packet that has been determined to be at least partially responsible for the denial of service flooding condition. A network device that receives the alarm signal can use the alarm signal to identify data packets having the identified characteristic and inhibit such data packets from being forwarded to a subsequent network location.

Other features and advantages of the present invention should be apparent from the following description, which illustrates, by way of example, the principles of the invention.

DETAILED DESCRIPTION

Figure 1:
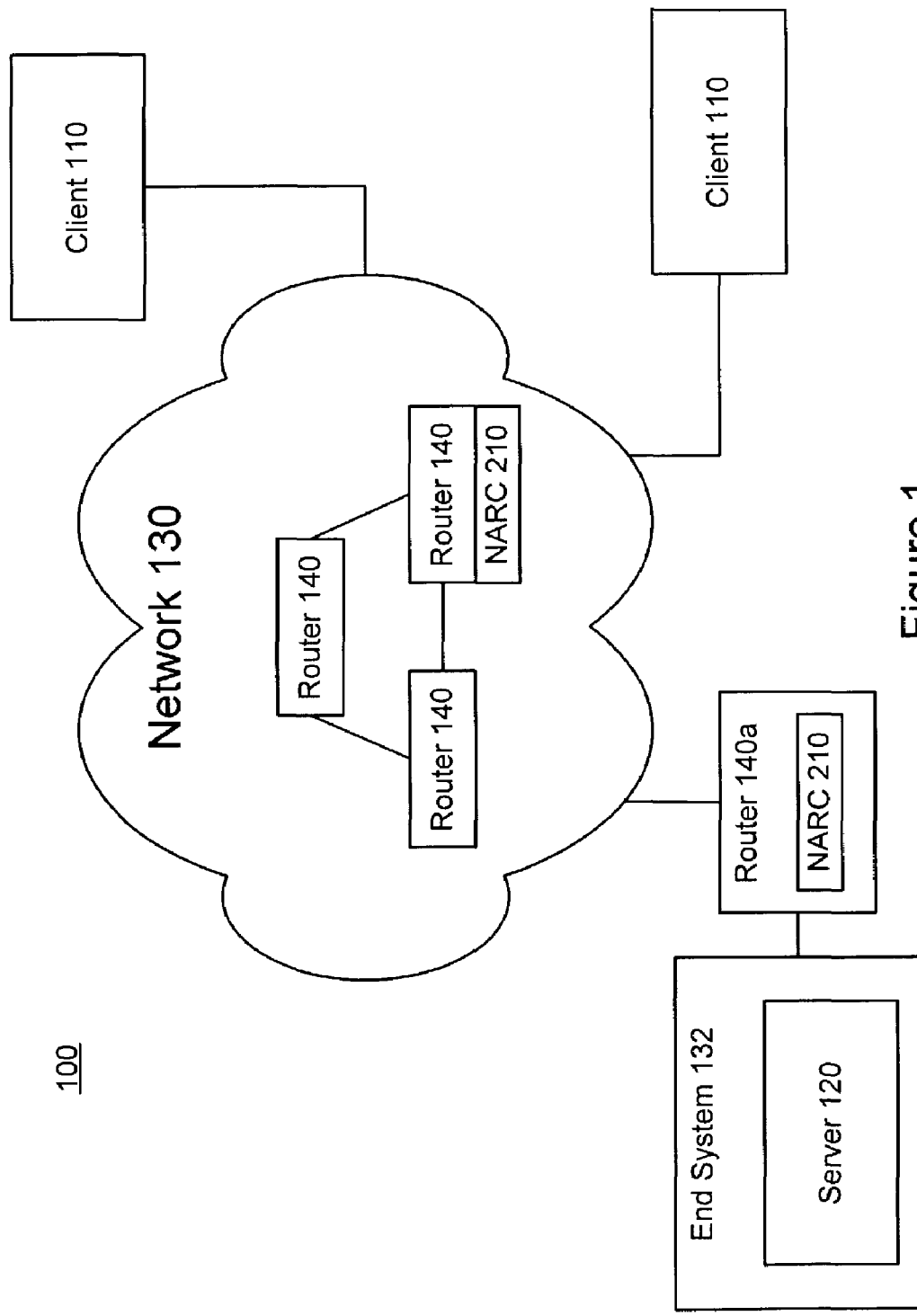
FIG. 1 is a block diagram of a computer network system that is configured in accordance with the invention.

FIG. 1 is a block diagram of a computer network system 100 comprised of one or more client computers 110 and one or more server computers 120, which are nodes of a computer network 130, such as the Internet. The server computer 120 can be part of an end system 132 that can comprise a local computer network, such as a local area network, that includes a plurality of network devices, such as the server computer 120 and client devices. One or more network routers 140 are disposed within and outside of the network 130 for routing communication packets through the network in a well known manner, including a network router 140a located at a gateway to the end system 132. The router 140a routes data between the network 130 and the end-system 132.

At least one of the routers 140 is configured to detect and protect against denial of service (DoS) attacks in accordance with one aspect of the invention. In this regard, the routers can include or host what will be referred to as a network attached router coprocessor (NARC) 210 that enables the host router to detect and protect against denial of service (DoS) attacks. The NARC 210 is described herein as being separate from its host router 140a, although it should be appreciated that the processes performed by a NARC 210 can be incorporated into the processing of its host router. The NARC 210 can function in various roles with respect to its host router. In one role, the NARC 210 functions as a "detector NARC" that examines network traffic passing through a host router to detect conditions in the host router that indicate the presence of a DoS attack. When conditions that indicate a DoS attack are detected, the detector NARC transmits an alarm signal that includes data that describes the offending network traffic that caused the DoS condition. The alarm signal is intended for receipt by at least one "network NARC". The role of the network NARC is to initiate one or more actions in response to receiving the alarm signal, such as, for example, checking for offending traffic in a host router and establishing a filter that inhibits the flow of offending traffic through the host router. The functionality of the NARCs can be implemented by a network device (such as a router, switch, or other computing device) that resides at a network location that receives and forwards data transmissions bound for the end-system.

A particular NARC 210 can function as a detector NARC, a network NARC, or as both a detector NARC and a network NARC, based upon programming instructions residing in memory of the NARC or based upon the hardware configuration of the NARC. The following nomenclature is used herein to differentiate references to NARCs operating in their various roles: a detector NARC is referred to as a "NARC[d] 210", a network NARC is referred to as a "NARC[n] 210", and a NARC is referred to generally as a "NARC 210". The NARC can be implemented as a separate hardware device hosted by the router, or it can be implemented as software in an otherwise conventional router, wherein the software implements the functionality described herein.

With reference still to FIG. 1, the client computers 110 can transmit requests for data over the network 130 to the server computer 120, which serves data over the network 130 in a well-known manner. A client computer 110 can be controlled by a user such that data requests that originate from the client computer 110 are legitimate requests for data. However, a client computer 110 can also be controlled (either directly or remotely) in a malicious manner such that a client computer 110 sends out data requests to the server computer 120 in an attempt to conduct a DoS attack on the server computer 120. Such maliciously-controlled computers are referred to herein as "zombies."

Figure 2:
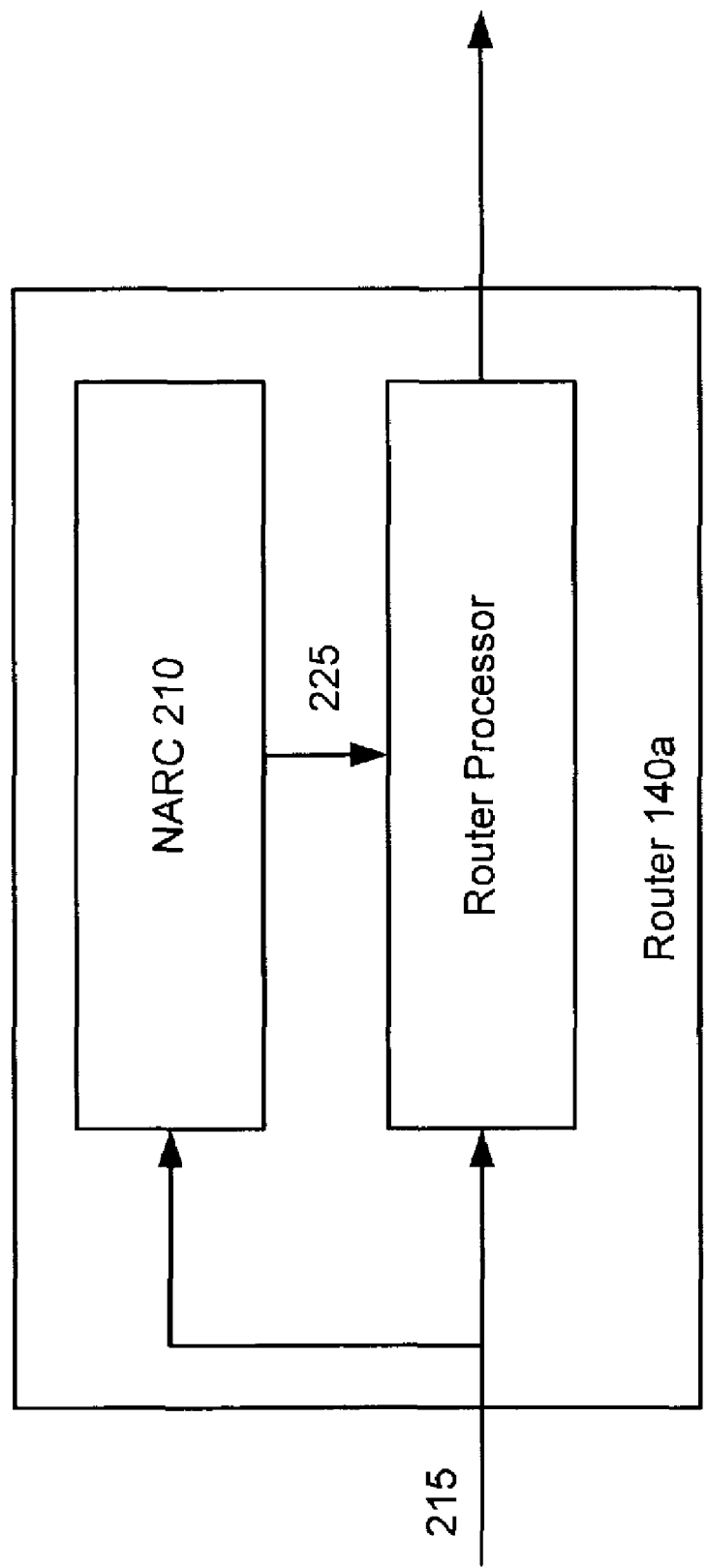
FIG. 2 is a schematic diagram of a network router and an adjunct network attached router coprocessor (NARC) of the invention.

FIG. 2 schematically shows the arrangement of a router 140 and a NARC 210 that is hosted by the router 140. In one configuration, the NARC 210 is communicatively attached to the router 140 but the NARC 210 is not a part of the router 140. Thus, the router 140 can function without having the NARC 210 attached. In another configuration, the NARC 210 is an integral part of the router 140 so that the router operations and NARC operations are not performed separately.

Data is provided into the router 140 and into the NARC 210 via network interface such as a data line 215 or other well-known network interface. Accordingly, all data packets that are transmitted to the router 140 are also transmitted to and received by the corresponding NARC 210. The data line 215 can be configured to transmit data according to a wide variety of protocols and standards, such as, for example, DS1, DS3, Ethernet, and Fast Ethernet. The NARC 210 can examine received data packets to perform denial-of-service protection, network monitoring, network traffic management, network traffic tracing, and metering and billing of network traffic. The NARC 210 can control operations of the router 140 through a control interface 225 with the router 140, as described further below.

Logging of Network Traffic Records for Host Router

The NARC 210 includes memory that permits data to be stored and retrieved. The NARC 210 maintains network traffic records in memory, wherein the network traffic records contain information regarding network traffic, such as data packets, that have passed through the NARC's host router 140. The recorded-information relates to attributes of the data packets, including attributes such as, for example, (1) source network address, such as source IP address; (2) destination network address, such as destination IP address; (3) source port; (4) destination port; (5) ICMP flags; (6) TCP flags for the data packets. Those skilled in the art will appreciate that a given data packet will typically contain such attributes in a header portion of the packet and that the attributes will each have specific values. For example, a first packet can have a source network address of 125.200.130.221. Thus, the value, or instance, of the source address attribute for the first packet will be 125.200.130.221.

The NARC 210 records the information by extracting and storing the specific instances of the attributes from packets received at the router 140 according to well-known methods. The NARC 210 can maintain network statistics pertaining to each attribute, such as how much bandwidth that a specific instance of an attribute has utilized, as described more fully below. It should be appreciated that the previously-mentioned attributes are merely exemplary and that the NARC 210 can store additional information, less information, or any combinations thereof regarding the data packets that were received by the router 140.

In one embodiment, the NARC 210 stores the source and destination addresses of the received data packets (and the associated statistical data) in one or more data structures comprised of binary trees. The NARC 210 maintains at least one binary tree that contains data relating to source addresses and maintains at least one binary tree that contains data relating to destination addresses. Each binary tree is comprised of data relating to a plurality of nodes, wherein each node represents and is associated with one or more possible network addresses. When the NARC 210 receives a data packet that has a specific source or destination address, the NARC 210 stores data relating to the data packet and associates the data with one or more nodes of the corresponding binary tree. This is described in more detail below with reference to an example shown in FIG. 3. It should be appreciated that it is not necessary to use a binary tree data structure, although the use of a binary tree is advantageous in that it permits filtering of increasingly specific portions of network address space, as described more fully below.

Figure 3:
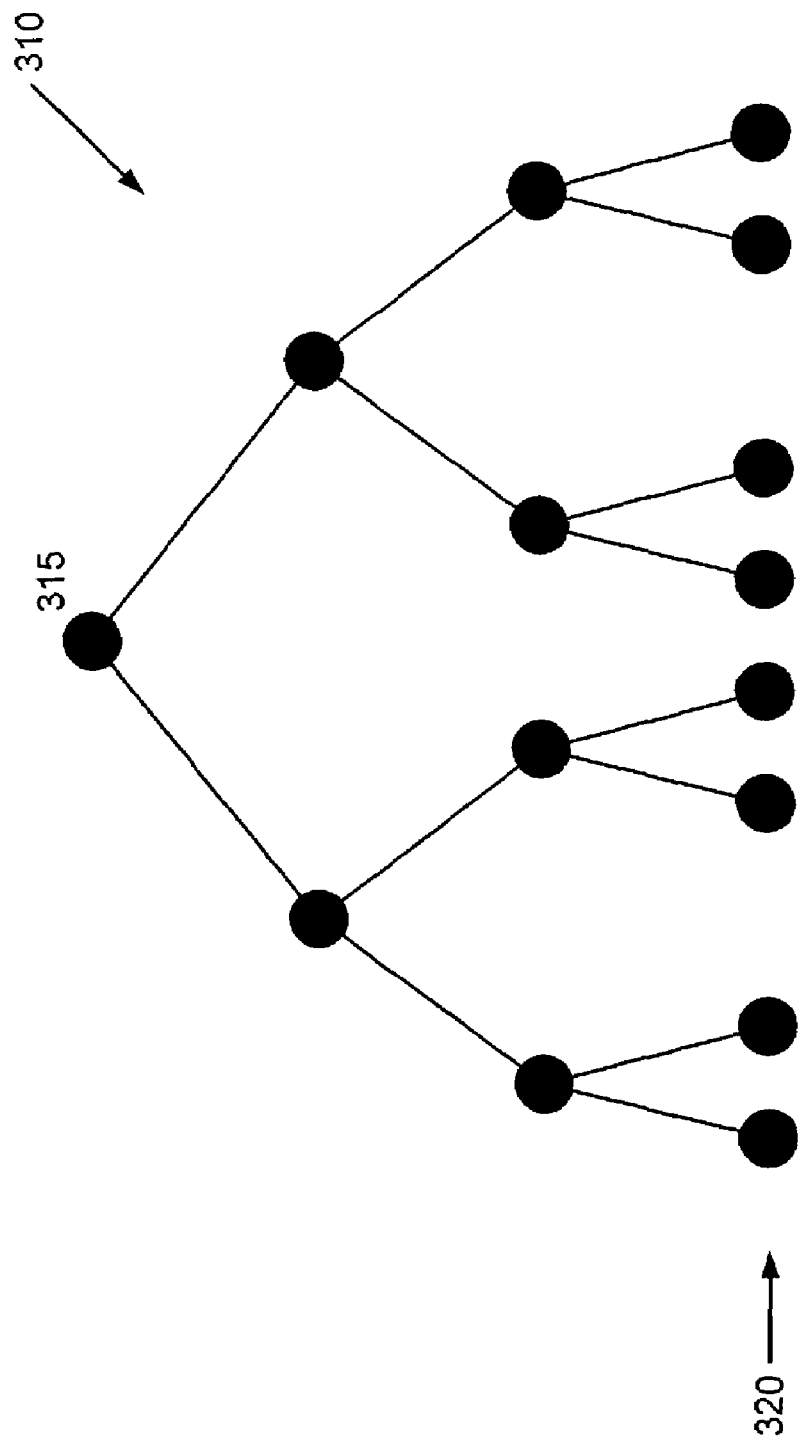
FIG. 3 illustrates the structure of an exemplary binary tree that represents a hierarchical set of data.

FIG. 3 illustrates the structure of an exemplary binary tree 310 that represents a hierarchical set of data. The binary tree of FIG. 3 has four levels, but it should be understood that a different number of levels can also be used depending on the network address set that is represented by the binary tree. The binary tree 310 has a root node 315 that represents all of the data in the data set. Moving downward through the binary tree 310, each node represents an additional level of specificity of source (or destination) address of the data represented by its parent node. For example, if the binary tree 310 represents a data set of network addresses, then the root node 315 represents the entire set of possible network addresses. Moving downward through the binary tree 310, each node represents an increasingly more specific set of network addresses. Each one of the bottom-most nodes 320 in the binary tree 310 is referred to as a leaf, and each leaf represents a specific network address.

Figure 4:
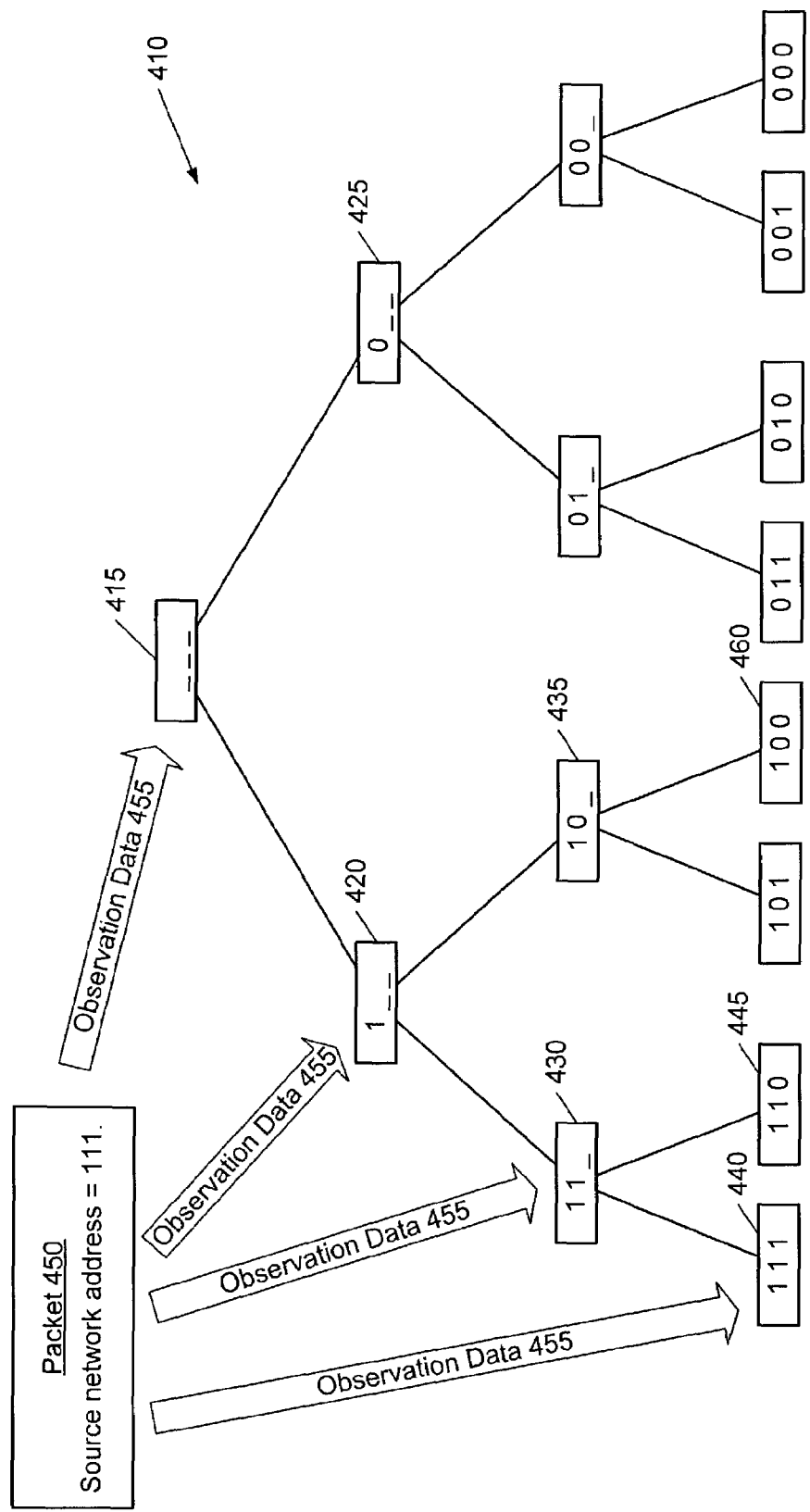
FIG. 4 illustrates the structure of an exemplary binary tree that represents a data set associated with three-bit network addresses.

This may be more easily understood with reference to the binary tree 410 shown in FIG. 4, which in its entirety represents a data set associated with source network addresses of received data packets. For ease of reference and illustration, the network addresses in FIG. 4 are three-bit network addresses, although it should be appreciated that actual network addresses may have any number of bits according to various protocols. In addition, it should be understood that a binary tree is an exemplary form of representing the network address space and that other data structures can also be used.

FIG. 4 illustrates each node of the binary tree 410 as a box that is labeled with the source network address(es) that the node represents. For example, the uppermost node 415 of the tree 410 represents all possible three-bit source network addresses. In other words, the uppermost node 415 represents the entire address space for three-bit source network addresses. The node 415 is labeled in FIG. 4 with three empty bit slots (_ _ _), where each empty slot indicates a variable bit value that can be either zero or one. Thus, data associated with this node 415 of the binary tree will be indicative of the entire set of source network addresses for received data packets. Moving downward one level in the tree 410, the node 415 branches into two additional nodes 420, 425 that each represents a subset of the address data set represented by the node 415, comprising a portion of the entire three-bit network address space. Specifically, the node 420 represents all source network addresses that have a left-most bit of one and data associated with this node 420 will be indicative of received data packets for the subset (1_ _) with a left-most bit of one. The node 425 represents all network addresses that have a left-most bit of zero. The nodes 420 and 425 in the binary tree 410 likewise each branch into two nodes, with nodes in subsequent lower levels representing successively more specific subsets of 3-bit network addresses. The downward branching of each node into two subset nodes continues until each of the bottom-most leaf nodes of the binary tree 410 represents a specific three-bit network address.

For example, the node 420 branches into a node 430 (representing all network addresses that begin with 11) and a node 435 (representing all network addresses that begin with 10). Likewise, the node 430 branches into two separate leaf nodes: a node 440 that represents the specific network address 111 and a node 445 that represents the specific network address (110).

It should be appreciated that the illustrated binary tree 410 is exemplary and that similar binary tree data structures could be used to store information for network addresses of any configuration. For example, the network addresses may comprise IP addresses, wherein an IP address has 32-bits for IPv4 and 128 bits for IPv6, as will be known to those skilled in the art. For example, in the case of 32-bit IP addresses, the corresponding binary tree structure could have thirty-three levels of nodes, with the leaf nodes each representing a specific 32-bit IP address and the root node representing all possible 32-bit IP addresses in the received data packets.

As the NARC 210 receives data packets, it records and sorts observation data relating to the specific attributes in the data packets. For each received data packet, the NARC 210 stores the observation data according to the binary tree by associating the observation data with the node or nodes that represent the network address (or subset of addresses) with which the observation data is associated. The observation data includes a timestamp (LT) and a fill level (FL). The timestamp indicates the last time that the NARC 210 observed a data packet containing the associated network address. The fill level (FL) is a metric that indicates how many times the NARC 210 has encountered a packet with the associated network address (or sub-address). Thus, the fill level for a given node will increase as the NARC 210 encounters additional packets that have a network address associated with the node.

An example of how the NARC 210 records and stores observation data for a received network address is described with reference to FIG. 4. In this example, the NARC 210 receives a data packet 450 that contains an exemplary source network address of "111". The NARC then records corresponding observation data 455 for the network address "111" and stores the observation data 455 in each of the nodes associated with the source network address "111". Thus, the values of LT and FL for these nodes will be updated. In the example, the nodes 415, 420, 430, and 440 all are associated with the network address "111", so the NARC 210 stores the observation data in a table data structure such that an index of "111" returns the observation data for the nodes 415, 420, 430, and 440. In another example, if the NARC 210 received a packet with a destination address of "100", then the NARC 210 would record the observation data such that the data is associated with the nodes 415, 420, 435, and 460. The NARC 210 can also maintain a binary tree for destination network addresses that stores observation data sorted according to destination network addresses, where the NARC receives outbound packets that are being sent to other network locations.

Use of NARC in DoS Attacks

Figure 5:
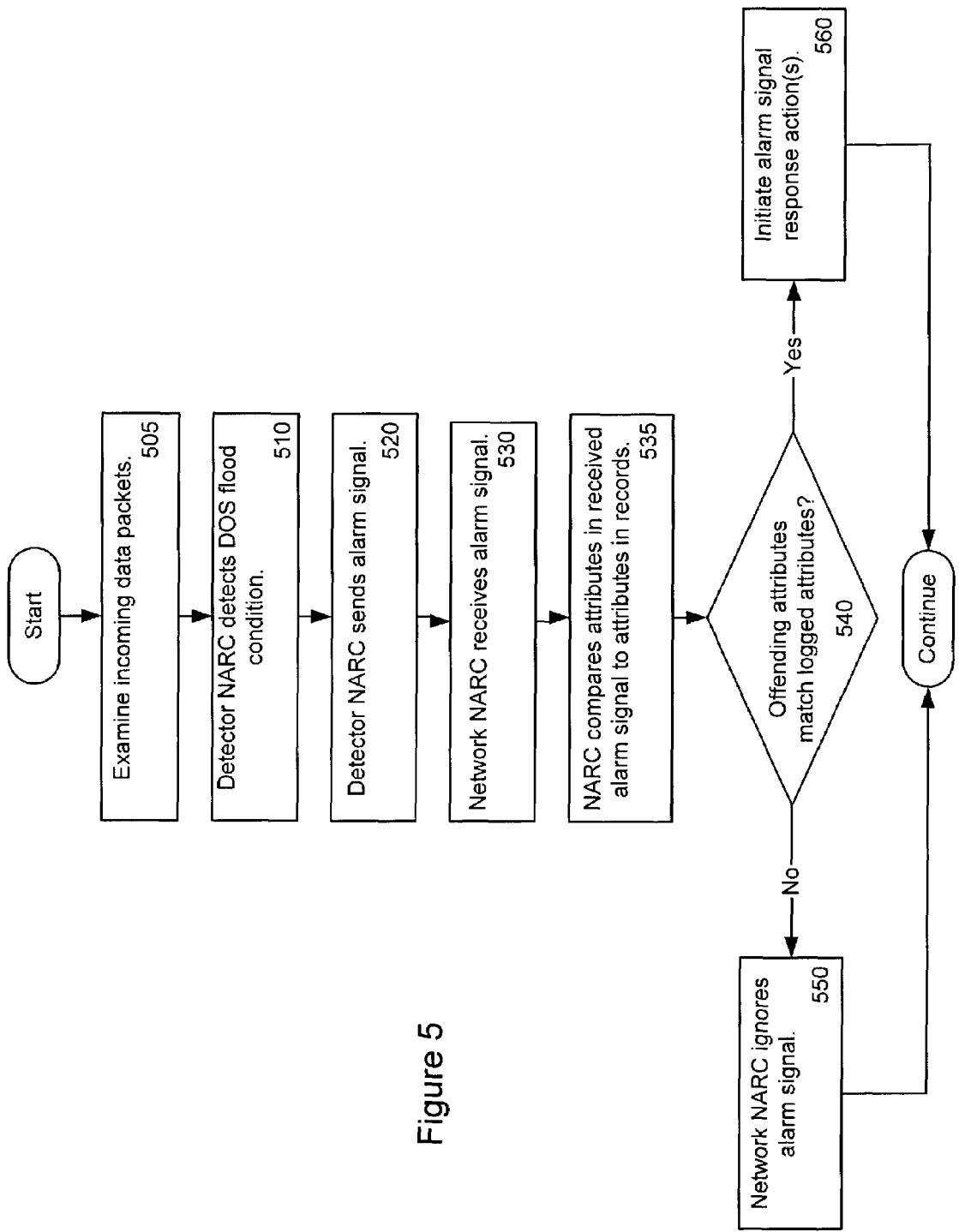
FIG. 5 is a flow diagram that describes the operations involved in protecting against a denial of service flooding attack.

FIG. 5 is a flow diagram that describes the operations involved in performing DoS flooding protection using at least one NARC 210. The operations are described with respect to a network example shown in FIG. 6, which shows a computer network 610, such as the Internet, that includes a plurality of interlinked computer networks and a local (end-system) network 615 having a server 620. The local network 615 is protected against DoS flooding attacks by a plurality of NARCs 210, each of which is communicatively attached to a host router 140. The NARCs 210 are located at various points throughout the network 610, including one or more network points through which data travels to reach the server 620.

Figure 6:
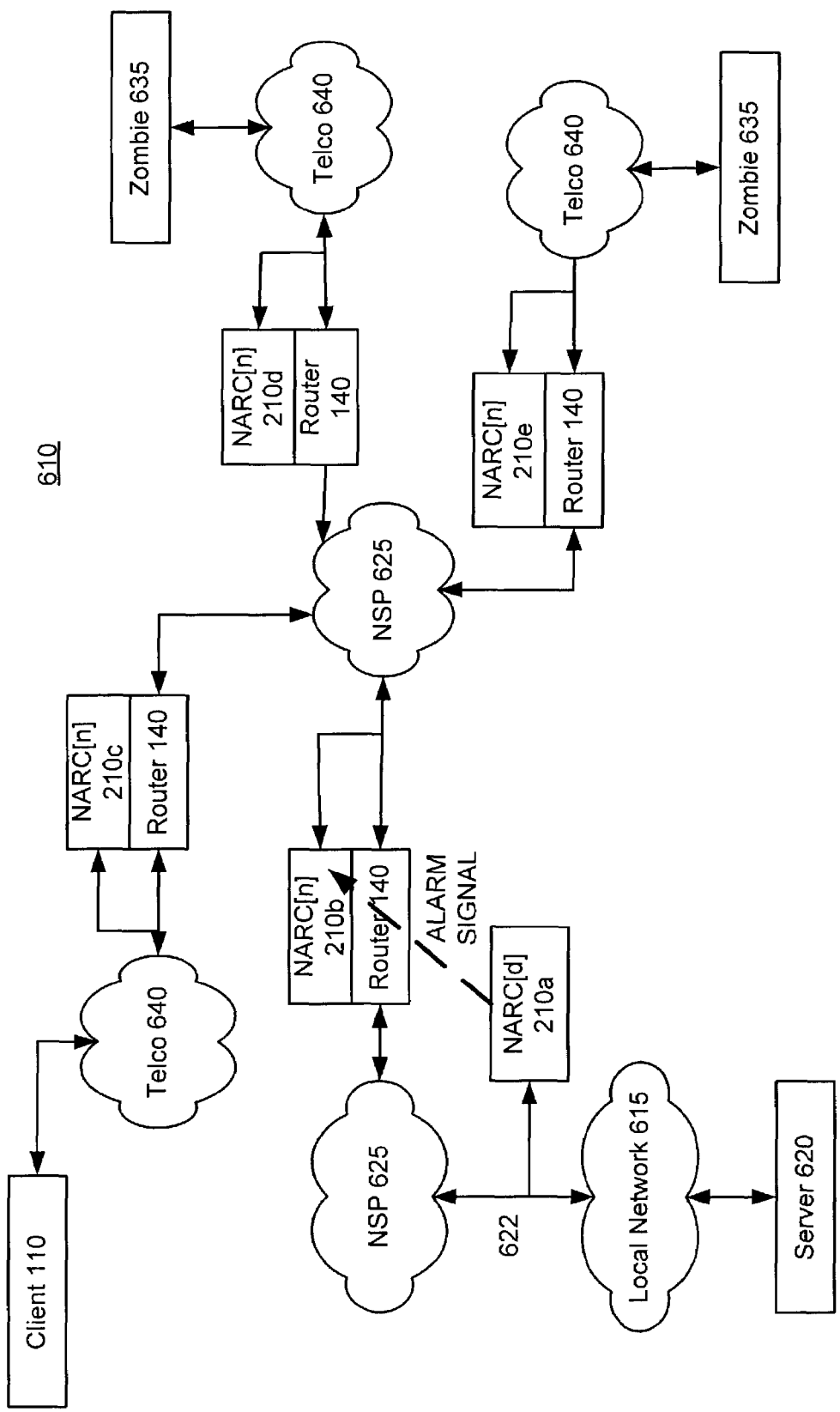
FIG. 6 is a diagram of a computer network, showing an exemplary situation where a NARC has detected a DoS flooding condition and has transmitted an alarm signal.
Figure 8:
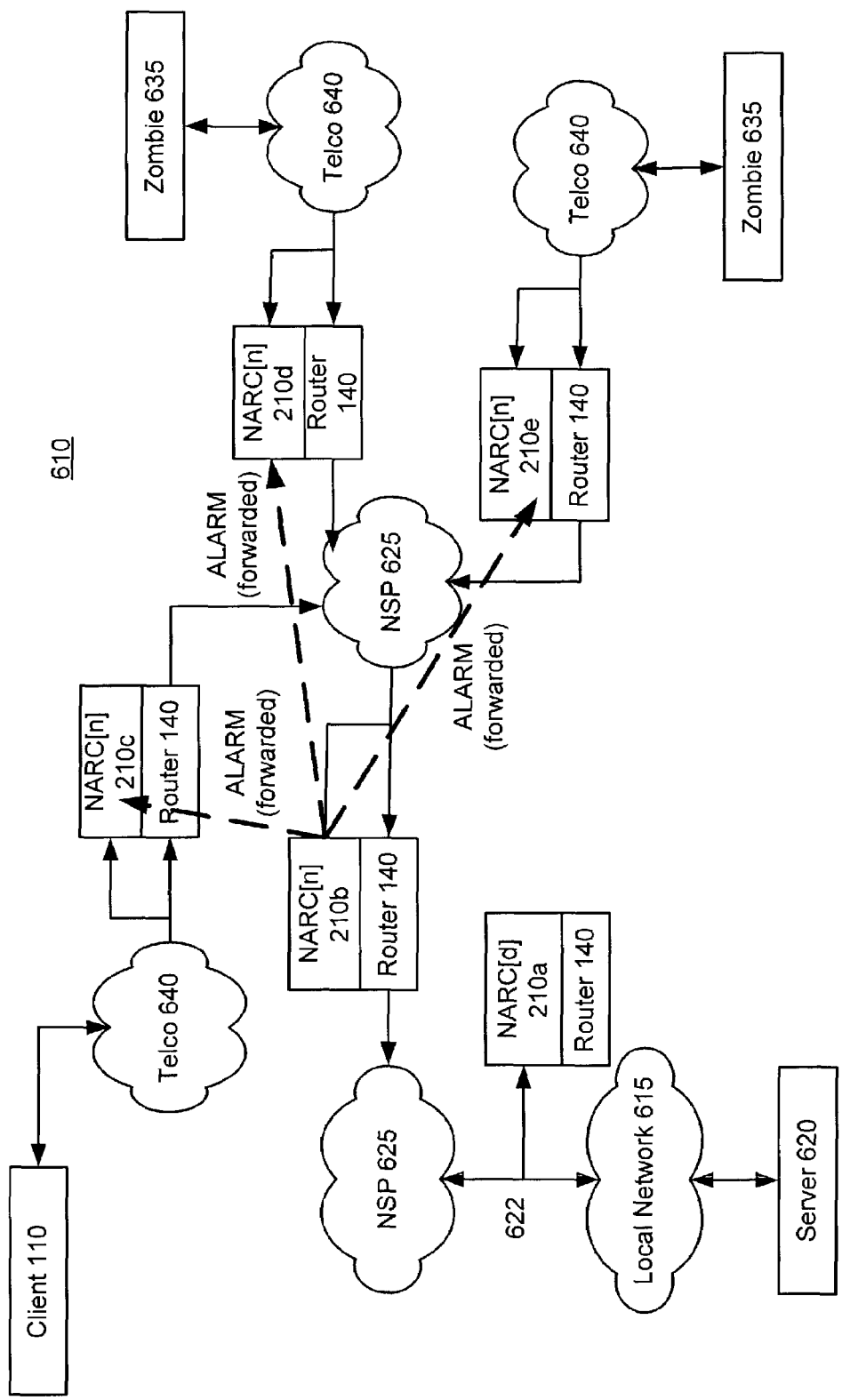
FIG. 8 is a diagram of a computer network, showing an exemplary situation where a NARC that received an alarm signal has forwarded alarm signals to several upstream NARCs.

In FIG. 6, a detector NARC is indicated with a [d] suffix, and a network NARC is indicated with a [n] suffix. The NARCs 210 include a detector NARC[d] 210a that is located at a network ingress 622 to the local network 615 so that the detector NARC[d] 210a can access and examine all data packets that enter the local network 615 from the network 610. In the embodiment shown in FIG. 6, the detector NARC[d] 210a is not shown attached to a host router, although the detector NARC[d] 210 may be attached to a host router, such as shown in FIG. 8. A plurality of network NARCs[n], including NARC[n] 210b, NARC[n] 210c, NARC[n] 210d, and NARC[n] 210e, are located at various locations within and throughout the computer network 610. The network NARCs[n] are each attached to a host router 140.

The computer network 610 includes one or more networks that are operated by network service providers (NSPs) 625. The routers 140 route communication data packets between the various networks 625 in the computer network 610 by examining network destination addresses contained in the data packets according to well-known processes. A plurality of zombies 635 have access to the network 610, such as, for example, through respective telephone company (Telco) networks 640. As mentioned, the zombies 635 are computers that are operated in a malicious manner in an attempt to conduct DoS flooding attacks on an intended victim, such as on the local network 615 and the associated server 620. The network NARCs[n] 210b, 210c, 210d, 210e are deployed to protect the local network 615 and are located at various points in the communication path between the zombies 635 and the local network 615. It should be appreciated that data packets originating at the zombies 635 must pass through at least one of the network NARCs[n] 210b, 210c, 210d, or 210e in order to reach the server 620. It should be appreciated that a single NARC that functions as both a detector NARC and a network NARC could also be used, although a plurality of NARCs could also be distributed as shown in FIG. 6.

Returning to the flow diagram of FIG. 5, the DoS flooding protection process begins at the operation represented by the flow diagram box numbered 505, where the detector NARC[d] 210a examines the flow of incoming data packets for an indication of a DoS flooding attack. The detector NARC[d] 210a is located at the network gateway to a server or local area network that is being protected, such as the local network 615 shown in FIG. 6. The detector NARC[d] 210 continues to examine incoming data packets until a DoS flooding condition is detected.

In the next operation, the detector NARC[d] 210 detects a DoS flooding condition at the ingress to the local network, as represented by the flow diagram box numbered 510 of FIG. 5. The DoS flooding condition is detected based upon the observed behavior of incoming data packets (the "offending data packets" or "offending traffic") that the detector NARC[d] 210a determines are part of an attempt to initiate a DoS flood at the local network 615 and server 620. The detector NARC 210 can use a particular method to detect DoS flood conditions, such as the method that is described in more detail below in the section entitled "Detection of DoS Flooding Condition." Alternately, a conventional method can be used to detect the presence of a DoS flooding condition.

After the detector NARC[d] 210a has detected a DoS flooding condition, the detector NARC[d] 210a transmits an alarm signal in an upstream direction of the network 610, as represented by the flow diagram box numbered 520 of FIG. 5. The upstream direction is relative to the end system and points away from the end system. The detector NARC[d] 210a can also establish a filter to prevent the offending traffic from passing through the host router, as described more fully below. The alarm signal is transmitted for receipt by one or more network NARCs[n] 210b, c, d, e that are upstream of the detector NARC[d] 210a. An example of this situation is illustrated in FIG. 6, which shows the detector NARC[d] 210a transmitting an alarm signal (represented by a dashed line in FIG. 6) to an immediate upstream network NARC[n] 210b. Although FIG. 6 shows the detector NARC[d] 210a transmitting a single alarm signal to a single network NARC[n] 210b, it should be appreciated that the detector NARC[d] 210a can transmit any number of alarm signals to any number of upstream network NARCs[n] 210.

The alarm signal includes information that identifies one or more characteristics of the offending traffic. The identified characteristics can be in the form of attribute data comprised of one or more values for an attribute contained in the offending data packets, such as the type of protocol of the offending data packets (such as, for example, TCP, UDP, ICMP, or IP), the source and/or destination network addresses of the offending data packets, and the source and/or destination ports associated with the offending data packets, as well as other information. For example, the attribute data can define one or more source network addresses, wherein the detector NARC[d] 210a extracts the source network address from an offending data packet and embeds the source address in the alarm signal, which thereby indicates to a receiving NARC that packets with the identified source address are offending traffic. The alarm signal may be implemented as a User Datagram Protocol (UDP) packet that contains data fields that indicate, for example, a timestamp, the IP address of the detector NARC [d] sending the packet, the characteristic of the offending traffic, a flag indicating the action to be performed by the network NARC[n] (filter or traceback message), and a digital encryption signature.

The data signal that is transmitted pursuant to the alarm signal operation 520 of FIG. 5 may also include an authentication feature, such as an encryption key. Upstream network NARCs[n] 210 can verify the authenticity of the alarm signal using encryption and also can verify the particular NARC from which the alarm signal originated, such as by examining data embedded within the signal. The encryption signature may be, for example, a one-way hash function of the alarm message using a secret part of an asymmetric key pair assigned to the detector NARC[d].

With reference again to FIG. 5, in the next operation, an upstream network NARC[n] 210 receives the alarm signal that was sent by the detector NARC[d] 210a, as represented by the flow diagram box numbered 530. An example of this situation is illustrated in FIG. 6, which shows the detector NARC[n] 210b receiving the alarm signal (represented in FIG. 6 as a dashed line) that was transmitted by the detector NARC[d] 210a.

The network NARC[n] 210 (such as the network NARC 210b in FIG. 6) that received the alarm signal then compares the attribute data of the offending traffic (contained in the alarm signal) with the corresponding attribute data contained in the NARC's network traffic records. This operation is represented by the flow diagram box numbered 535. As discussed above, each NARC 210 maintains network traffic records that represent a history of the data packets that have passed through its host router. If the attribute data contained in the alarm signal matches attribute data contained in the NARC's network traffic records, then this indicates that offending traffic may have passed through the NARC's host router.

The next operation is represented by the decision box numbered 540 in FIG. 5, where the network NARC[n] 210 that received the alarm signal determines whether any attribute data contained in the alarm signal matches any attribute data logged in its network traffic records. For example, the alarm signal can identify a specific source address or a group of source addresses as the attribute data associated with the offending data packets. In such a case, the network NARC[n] 210b that received the alarm signal examines its records to check whether the identified source address or a group of source addresses is contained in its network traffic records.

If there is no match (a "No" result from the decision box numbered 540), then this result indicates that the offending data packets did not pass through the host router of the network NARC[n] 210 that received the alarm signal. In such a case, the network NARC[n] 210 simply ignores the alarm signal and need not take any action in response to the alarm signal, as represented by the flow diagram box numbered 550. Alternately, the network NARC[n] 210 can send a confirmation signal to the originator of the alarm signal notifying it that the offending traffic did not pass through the network NARC[n] 210.

If the network NARC[n] 210 that received the alarm signal determines that the attribute identified in the alarm signal indeed matches one or more attributes in its network traffic records, a "Yes" results from the decision box numbered 540. This result indicates that the offending data packets may have traveled through the host router 140 of the network NARC[n] 210 prior to arriving at the detector NARC[d] 210 that originated the alarm signal. It also indicates that at least one of the offending data packets originated at a location upstream of the network NARC[n] 210 that received the alarm signal. The network NARC[n] 210 that received the alarm signal then initiates one or more alarm signal response actions, as indicated by the flow diagram box numbered 560. The alarm signal response actions are described in more detail below with reference to the flow diagram shown in FIG. 7.

Figure 7:
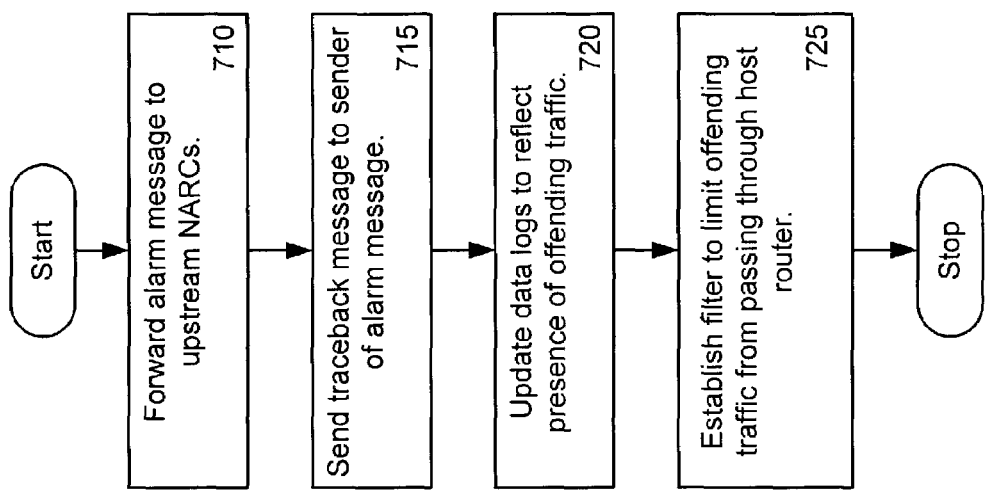
FIG. 7 is a flow diagram that describes the processes that a NARC performs upon receipt of an alarm signal, where the NARC has determined that offending data packets have passed through the NARC's host router.

FIG. 7 is a flow diagram that describes the processes that a network NARC[n] 210 performs upon receipt of an alarm signal, where the network NARC[n] 210 has determined that offending data packets have passed through the NARC's host router. In the first operation, represented by the flow diagram box numbered 710, the network NARC[n] 210 forwards the alarm signal to other network NARCs[n] 210 that are located upstream in the computer network.

FIG. 8 shows an example of this, where the network NARC[n] 210b that originally received the alarm signal from the detector NARC[d] 210a has forwarded several alarm signals (represented by dashed lines in FIG. 8) to several upstream network NARCs[n] 210, including network NARC[n] 210c, network NARC[n] 210d, and network NARC[n] 210e. Each network NARCs[n] 210 that received the forwarded alarm signal can then determine whether offending data packets have passed through its respective host router and can take appropriate action according to the processes shown in the flow diagram of FIG. 5. In this manner, the network NARCs[n] that identify offending traffic will forward alarm signals upstream until there are no additional upstream NARCs to which alarm signals can be forwarded. Each network NARC[n] 210 can maintain in memory a list of the network locations of other network NARCs[n] to which to forward alarm signals. For example, NARCs can be manually configured at installation with information necessary to contact other NARCs. This enables a network NARC to know the network location to which an alarm signal will be forwarded.

Alternately, a NARC can send downstream identification messages to other NARCs to indicate the presence and location of the NARCs sending the identification message. This can be carried out at regular time intervals. The identification messages can be intercepted by downstream network NARC[n]s located between the sending NARC and the receiving NARC. The intercepted identification message can provide information to a downstream network NARC[n] regarding the presence of one or more upstream network NARC[n]s that recognize the same NARC[d] and can therefore be used for forwarding alarm signals.

With reference again to the flow diagram of FIG. 7, the network NARC[n] 210 that identified offending traffic then sends a traceback message back to the NARC 210 that sent the alarm signal to it, as represented by the flow diagram box 715. A traceback message serves as an acknowledgement that the alarm was received and that offending traffic may have traveled through the originator of the traceback message. A NARC 210 that receives a traceback message then forwards the traceback message to a downstream NARC 210 until the detector NARC[d] 210 from which the alarm signal originated ultimately receives the traceback message. The series of traceback messages thereby define the network pathway along which the offending traffic traveled. A traceback message can be, for example, a UDP message that contains a timestamp, the IP address of the sending NARC, and a description of the offending traffic triggering the traceback message (which may coincide with the original description contained in the alarm message or which may be modified by the sending NARC to better fit the sending NARCs profiles). The traceback message can also include a list of filtering rules that are considered the most efficient way to block the offending traffic while not blocking legitimate traffic), as well as a digital signature of the original alarm message that triggered the traceback message.

Figure 9:
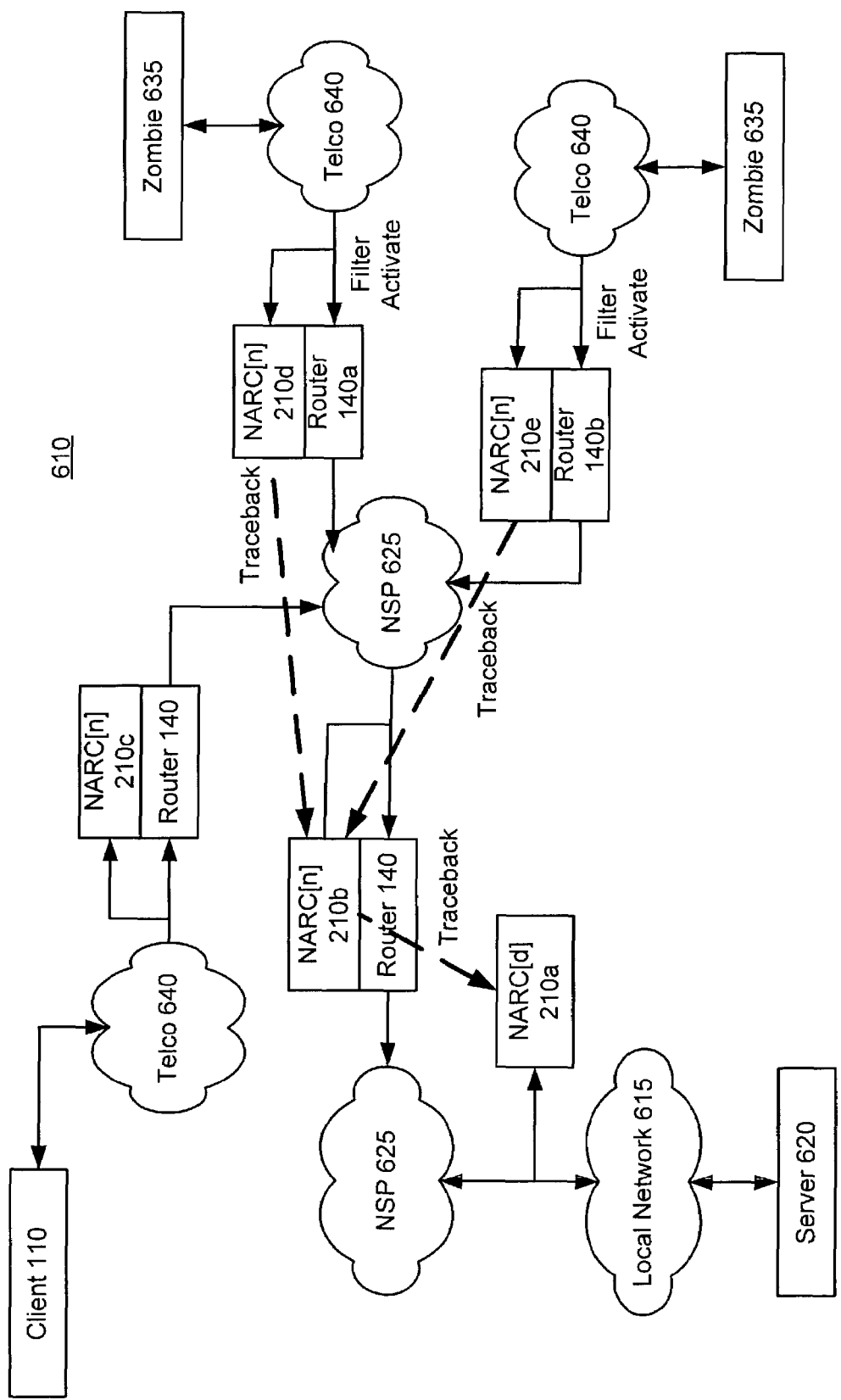
FIG. 9 is a diagram of a computer network, showing an exemplary situation where two NARCs have established filters and have sent traceback messages to the NARC from which they received the alarm signal.

FIG. 9 shows an example of this situation, where two of the network NARCs[n] 210 (NARCs[n] 210d and 210e) have sent traceback messages (represented as dashed lines in FIG. 9) to the network NARC[n] 210b from which they received the alarm signal. Note that the two network NARCs [n] 210d, 210e that originated the traceback messages have identified offending traffic that originated at the respective zombies 635 and that passed through the two network NARCs[n] 210d, 210e on way to the detector NARC[d]

210*a*. Also note that one of the network NARCs[n] 210 (NARC[n] 210*c*) did not send a traceback message, which indicates that this network NARC[n] 210*c* did not observe any offending network traffic.

With reference again to the flow chart of FIG. 7, after the network NARC [n] sends a traceback message, the network NARC[n] 210 then establishes a data log that memorializes that an alarm was received and that the network NARC[n] 210 has identified offending traffic. This operation is represented by the flow diagram box numbered 720.

In the next operation, represented by the flow diagram box numbered 725, the network NARC[n] 210 that identified the presence of offending traffic establishes a filter at its host router 140. The filter limits or prevents the traffic that matches the attribute data in the received alarm message from exiting through the NARC's host router 140. FIG. 9 shows an example of this, where filters are identified as activated at the routers 140*a,b* (attached to NARCs[n] 210*d,e*, respectively) where offending traffic was identified. It should be appreciated that the network NARCs[n] 210 can be operated with any combination of the aforementioned alarm response actions. The NARCs 210 do not necessarily have to install the filter in response to an alarm signal, but could merely log the presence of offending traffic, send a traceback message, forward the alarm signal upstream, or any combination thereof.

Detection of DoS Flooding Condition

As discussed above, the detector NARC[d] 210*a* detects when a DoS flooding condition is present in an associated router 140 and sends out an alarm signal in response. In one embodiment, the detector NARC[d] 210*a* detects a flooding condition based upon the observed accumulated appearance of data packets having predetermined attribute data, as reflected by the records that the detector NARC[d] 210*a* maintains. As mentioned, a NARC[d] 210*a* maintains such attribute records in one or more data structures, such as a binary tree for network addresses and arrays for ports and flags.

As noted above, for each specific instance of a data packet attribute (such as a specific source address or destination address), the detector NARC[d] 210*a* maintains observation data, including a timestamp (LT) and a fill level (FL). A threshold value (T) and a leak rate (R) are also associated with the attributes. The threshold T and leak rate R are arbitrarily set by an operator, such as during router configuration. The timestamp indicates the last time that the detector NARC[d] 210*a* encountered a data packet with a specific instance of that attribute. The fill level indicates the accumulated times that the detector NARC[d] 210*a* has encountered a data packet with that attribute. In other words, the fill level indicates the bandwidth consumption over time for data packets with a specific attribute value. The threshold T is the point at which an alarm signal is sent. If the fill level for an attribute exceeds the threshold T for that attribute, then this is considered to be an indication of a DoS flooding condition and an alarm signal is sent. The NARC detector 210 can periodically decrease the fill level FL for an attribute at a leak rate R, as described below.

For example, assume that DoS flooding is detected based upon the detector NARC[d] 210 observing an increased flow of data packets having the same source address or the NARC[d] 210 observing an increased flow of data packets from a block of source addresses. Over time, the detector NARC[d] 210 will have recorded a fill level for certain source addresses as the detector NARC[d] 210 encounters data packets with the source address. On each observation of a data packet with that source address, the NARC[d] 210 increases the fill level FL of each corresponding node in the source address binary data tree to reflect the accumulated observance. However, the NARC[d] 210 also periodically decreases the fill level at a rate R, such as according to a "leaky bucket" algorithm. If the fill level FL for a source address exceeds the corresponding threshold T for a tree node, then the source addresses included in the node are considered harmful and are classified as an attribute to be filtered out. An alarm signal is then sent as described above. The alarm signal identifies the source addresses that are included in the node for which the fill level FL exceeded the threshold T.

This process is described in more detail with reference to FIG. 10, which is a flow diagram that describes the operations by which a detector NARC[d] 210 detects the presence of a DoS flooding condition at the NARC's host router. In the first operation, represented by the flow diagram box numbered 1010, the NARC[d] 210 monitors its host router for packets. That is, the NARC[d] 210 monitors the flow of data packets received at the host router. The NARC[d] 210 can detect when packets are received at its host router according to well-known methods. In the next operation 1015, the NARC[d] 210 detects that the host router has received a packet.

The next operation is represented by the flow diagram box numbered 1020, where the detector NARC[d] 210 updates the observation data in connection with the packet's specific attributes. Thus, every time the NARC[d] 210 receives a packet, it increases the fill level for the specific instances of the attributes in the packet. For example, the packet will have a specific source IP address that indicates the IP address where the packet originated. The detector NARC [d] 210 will increase the fill level associated with the specific source IP address in the received packet so that every time that the NARC[d] encounters a packet with that source IP address, it increases the fill level for that address. The fill level can therefore be considered a metric that indicates the accumulated usage over time of the corresponding attribute value. The detector NARC [d] can periodically decrease the fill levels at a rate R, so that the fill levels will decrease over time. Thus, the fill level for a given attribute value can decrease to zero if a packet with that attribute value is not encountered for a certain period of time.

In the case of source and destination addresses, the NARC[d] 210 updates the fill levels for the nodes in the binary tree that correspond to the addresses. Thus, when a NARC 210 encounters a data packet, it updates the fill levels of each applicable node in the data structures corresponding to the destination and source addresses in the packet. Thus, the fill levels for the destination address and source address attributes can be associated with a specific address or with a group of addresses, depending on the node, and each node will have a corresponding fill level that is indicative of the accumulated usage of the source addresses represented by that node. In order to simplify the maintenance and comparison of tree nodes at different levels, both the leak rate and the thresholds for each node are weighted by multiplying them by the a normalizing parameter that is based on the level of the node in the tree. In one embodiment, the normalizing parameter is the following:

$$Base^{Level}$$

where Base is a configurable parameter <2 and level is a number from 0 to 31 that indicates the level of the node in the tree. This normalization allows the direct comparison of the bandwidth utilization of leaf nodes (host addresses) with the utilization of higher-level nodes (network addresses). It has been determined that if Base=2, the normalization function would equalize all values in the tree and any intermediate node would have a value at most equal to the average of its leaves (in case all leaves have the same FL). This does not provide effective operation. By choosing a base value less than 2, the weighting of the tree is skewed toward intermediate nodes, thus offering a convenient way to control the sensitivity of the aggregation mechanism.

Figure 10:
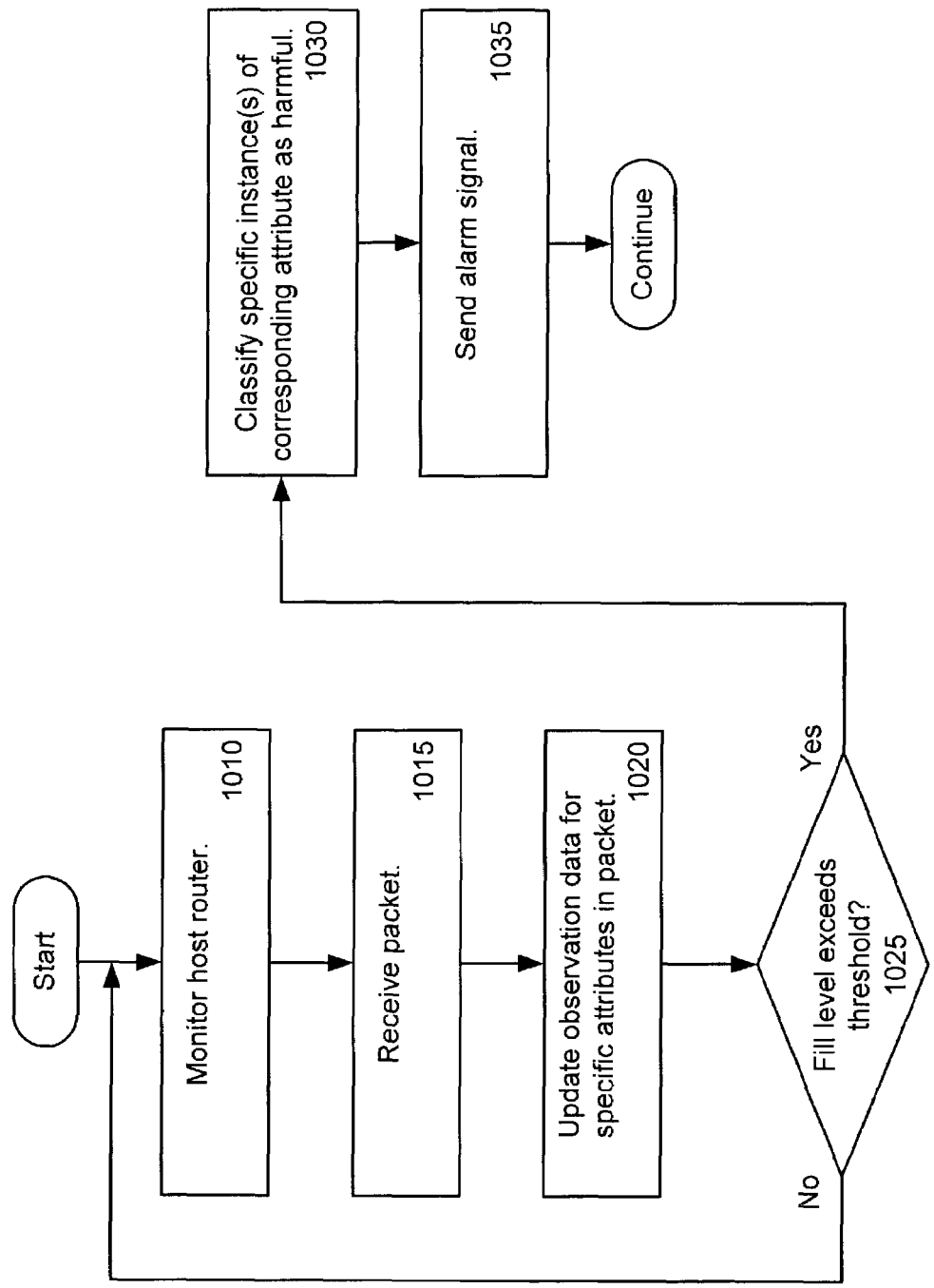
FIG. 10 is a flow diagram that describes the process by which a NARC detects the presence of a DoS flooding condition at a host router.

Referring still to FIG. 10, in the next operation, represented by the decision box numbered 1025, the detector NARC[d] 210 examines all of the fill levels that it maintains in memory and determines whether any of the fill levels have exceeded a threshold T. The threshold T may be different depending on the attribute to which it corresponds. If none of the fill levels exceed the corresponding threshold (a "No" result from the decision box 1025), the process returns to the operation represented by the flow diagram box numbered 1010, where the NARC[d] 210 continues to monitor the host router for packets.

If the detector NARC[d] 210 determines that one of the fill levels has exceeded its corresponding threshold (a "Yes" result from the decision box numbered 1025), the process proceeds to the operation represented by the flow diagram box numbered 1030. In this operation, the detector NARC [d] 210 classifies the specific instance(s) of the attribute that exceeded the threshold as "harmful", which means that data packets that have the specific instance(s) of the attribute are responsible for the DoS flooding condition. The detector NARC[d] can classify a specific instance of an attribute as harmful or can classify a group of instances of an attribute s harmful. For example, the fill level that exceeded the threshold value could be associated with a node of a source address binary tree, wherein the node represents a group of source addresses. In this case, the entire group of source address represented by that node is classified as harmful.

In the next operation, the detector NARC[d] 210 sends an alarm message that identifies the specific instances of the attribute(s) that have been classified as harmful. This operation is represented by the flow diagram box numbered 1035.

The level of sensitivity of the detector NARC's flooding detection process is generally governed by the values of the two vectors T and R (the threshold value and the leak rate). The values for T can be administratively set through configuration, while R is determined at runtime through a training phase of the detector NARC[d] 210. R is computed by training the detector NARC[d] 210, wherein the detector NARC[d] 210 observes network traffic for a sufficient amount of time while adjusting (increasing or decreasing) the values of R so that no fill levels ever exceed the value T. Over time, the training accounts for network traffic regions that have an increased frequency of appearance.

Moreover, the T values can be heuristically determined to be progressively higher for the protocol attributes that, if filtered, could affect progressively larger numbers of clients. The T values can therefore progressively increase according to the following order (1) source port; (2) source IP address; (3) TCP flags; (4) ICMP flags; (5) destination port; and (6) destination IP address. This ordering has the effect of combining the detection of all types of floods, without loss of generality, from (1) less sophisticated (with fixed source addresses or fixed flags) to (2) the most sophisticated floods which can only be filtered by the upstream filtering of destination ports or addresses.

Establishment and Maintenance of Filters

Figure 11:
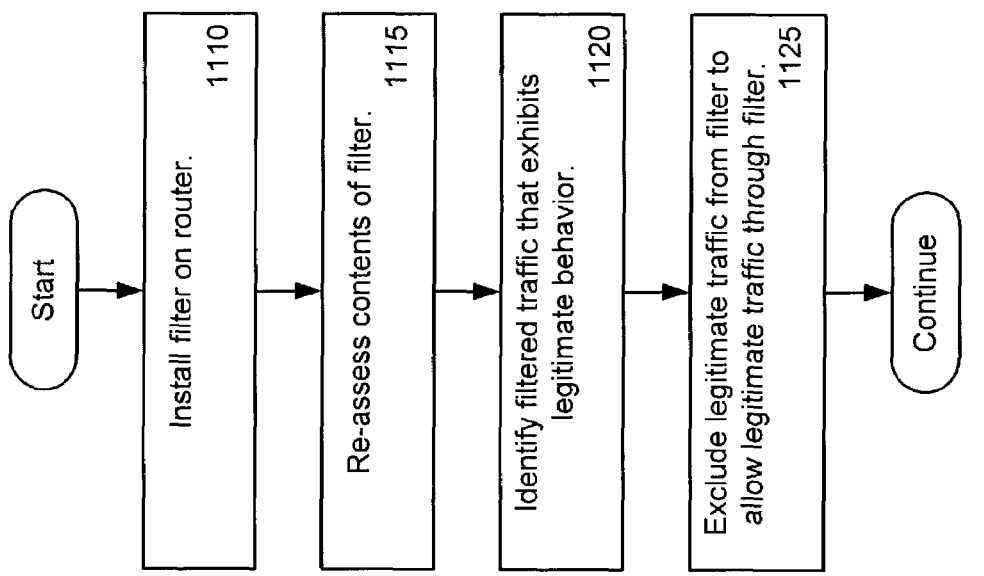
FIG. 11 is a flow diagram that describes how a NARC establishes and maintains a filter that inhibits the flow of offending communication traffic through a host router.

When the filters are established, the network NARCs[n] 210b intelligently manage the filters to distinguish legitimate packets from offending or harmful packets and thereby enable the legitimate packets to pass through the filter. As used herein, a "legitimate" packet is a packet that a NARC 210 has classified as not part of a DoS flooding attack. FIG. 11 is a flow diagram that describes how the NARCs establish and maintain a filter that inhibits the flow of offending communication traffic through a host router. The process is performed by a NARC 210 that has determined that offending traffic has passed through its host router. In the first operation, represented by the flow diagram box numbered 1110, the NARC 210 establishes a filter in its host router, wherein the filter prevents the host router from allowing any offending communication traffic to exit the router. The offending traffic is a packet that has the specific instance(s) of the attribute identified in a previously-received alarm signal. The NARC 210 can issue commands to the host router that causes the router to inhibit the flow of offending traffic in a well-known manner.

As discussed, the NARC 210 can filter packets based on any of a variety of attributes associated with the data packets. In one embodiment, the NARC 210 filters the packets based upon a network address contained in the packet, such as, for example, a source address or block of source addresses that was previously associated with offending traffic, which source address(es) were specified in an alarm signal. Thus, the NARC 210 will prevent packets with the specified source addresses from passing through the host router. The NARC 210 can use its binary tree data structure of source network addresses to manage the filter by flagging as harmful the node in the binary tree that corresponds to the blocked addresses. Thus, a portion of the entire source network address space will be filtered, wherein the filtered address space is identified by a node of a binary tree structure.

After the filter has been activated, the NARC 210 will continuously re-assess the filter to determine whether any packets that fall within the filter parameters have attributes that indicate that the packets should not be blocked by the filter, as represented by the flow diagram box numbered 1115. For example, if the NARC 210 is using a block of source address as a basis for the filter, the network NARC[n] 210b identifies the node in the data tree structure that corresponds to the network source addresses identified as harmful. The identified node may form the root of a subtree that includes legitimate source addresses as well as source addresses from offending packets. Pursuant to the operation of the flow diagram box 1115, the network NARC[n] 210b then iteratively examines each node in the subtree to determine whether any of the nodes of the subtree include network source addresses that are determined to be legitimate.

In the next operation, the NARC 210 identifies one or more specific instances of the filtered attribute that exhibit behavior that indicates that packets with the specific instance of the attribute are not part of the DoS flooding attack. This operation is represented by the flow diagram box numbered 1120. In one embodiment, the NARC 210 identifies a legitimate source address (or other attribute) by examining the "backoff" behavior of the flow of data packets that contain the source address. After the filter is installed, the flow of data packets that originated at certain source addresses will exhibit a backoff behavior associated with reliable transport protocols such as TCP or FTP. Such transport protocols require a network host device to "backoff", or lower the rate at which data packets are sent, if an acknowledgment is not received from the receiving device. However, zombie devices generally do not exhibit backoff behavior. Where the filter is activated, the associated NARC [n] 210b will detect that the stream of data packets that originated at legitimate network devices will exhibit backoff behavior, while the stream of data packets that originated from zombies will not backoff. The network NARC[n] 210b classifies as legitimate those source addresses where backoff behavior is detected. The backoff behavior can be detected by examining, at regular time intervals, the accumulated flow of received data packets (as represented by fill level FL) of all of the binary tree nodes associated with source addresses that have been filtered. In one embodiment, the logarithms of the sampled values are then fitted to a linear decrease (slope) using a least squares algorithm. The slope, the intercept, and the error estimations of the linear fit are combined to provide a score for each of the tree nodes below the node associated with the filtered network address. A high score in a tree node below a filtered node indicates that the tree node is exhibiting consistent backoff behavior, as exhibited in a stable and decreasing linear fit.

The NARC 210 then excludes from the filter those packets that have the specific instances of the attribute that have been classified as legitimate, as represented by the flow diagram box numbered 1125. For example, in the case of source addresses, the network NARC 210 can exclude from the filter certain nodes in the source address binary tree that correspond to legitimate addresses, as well as the subtrees rooted at those nodes. The network NARC 210 modifies the filter to exclude the legitimate source addresses so that packets with the legitimate source address can pass through the filter, as these packets originated from a source that exhibited a backoff behavior. The network NARC[n] 210 continuously examines the nodes associated with the blocked source addresses in an attempt to identify source addresses that are legitimate. In this manner, the NARC[n] 210 continuously updates the filter so that legitimate network traffic is allowed through. The examination may be repeated, for example, at regular time intervals or after a certain quantity of packets have been processed.

The filter thus functions as a shield that prevents network packets with source addresses in certain regions of the network address space from passing through the router 140. However, the shield has "holes" that exclude from the filter those network packets with source address that were identified as legitimate. In this manner, the filter is continuously adjusted to allow traffic identified as legitimate to pass through the filter.

The NARC can eventually entirely remove a filter when it is determined that the filter is no longer necessary. The network NARC[n]s continuously examine the root nodes associated with blocked addresses to detect that the presence of the filter is no longer necessary. Such detection can be performed by continuously comparing the fill level FL of the root nodes associated with blocked addresses with the FL of those nodes immediately prior to establishment of the filter. The comparison (which can be weighted by a tolerance factor that takes into account the time difference) can indicate that the filtered traffic has subsided below the level that caused the detector NARC[d] to send the alarm messages. In such a case, the filter can be removed. This technique causes the removal of filters that have a decreasing effect on the sending rate of the sources. This mechanism can be used to both detect the stop of a flooding attack as well as detect the wrongful insertion of a filter that affects the communication of sources that exhibit a backoff behavior.

The present invention has been described above in terms of one or more embodiments so that an understanding of the present invention can be conveyed. There are, however, many configurations for the disclosed network attached router coprocessors not specifically described herein but with which the present invention is applicable. The present invention should therefore not be seen as limited to the particular embodiment described herein, but rather, it should be understood that the present invention has wide applicability with respect to network denial of service protection generally. All modifications, variations, or equivalent arrangements and implementations that are within the scope of the attached claims should therefore be considered within the scope of the invention.

What is claimed is:

1. A method of protecting against a computer network denial of service flooding attack, comprising:
   determining that data packets deemed responsible for a denial of service flooding condition have been received at a first network location;
   establishing a filter that prevents the data packets deemed responsible for the denial of service flooding condition from being forwarded from the first network location;
   monitoring a flow of data packets received at the first location to determine whether the flow of data packets exhibits legitimate behavior, such that the flow of data packets that exhibits legitimate behavior is deemed to originate from a legitimate source that is not responsible for the denial of service flooding condition; and
   modifying the filter to filter increasingly specific portions of network address space of the data packet source wherein a corresponding greater portion of the data packets that originate from a legitimate source are not filtered and are forwarded from the first network location.

2. A method as defined in claim 1, wherein determining whether the flow of data packets that exhibit legitimate behavior comprises determining whether any data packets originate from a network source that exhibits a backoff behavior.

3. A method as defined in claim 1, additionally comprising:
   identifying at least one data packet characteristic such that data packets having the data packet characteristic are deemed to be responsible for the denial of service flooding condition;
   transmitting an alarm signal to a second network location, the alarm signal identifying the data packet characteristic, wherein a device that receives the alarm signal can use the alarm signal to inhibit the data packets having the data packet characteristic from passing through the second network location.

4. A method as defined in claim 3, wherein the alarm identifies the data packet characteristic in the form of at least one value of a data packet attribute.

5. A method as defined in claim 4, wherein the data packet attribute includes protocol type, source network address, destination network address, destination port, or source port.

6. A method as defined in claim 1, additionally comprising:
   maintaining network traffic records that reflect the bandwidth consumption over time of data packets received at the first network location;

sorting the network traffic records according to characteristics of the data packets;

wherein it is determined that the denial of service flooding conditions is present at the first network location when the network traffic records indicate that the bandwidth consumption over time for data packets having a specific characteristic has exceeded a threshold.

7. A method as defined in claim 4, wherein sorting the network traffic records according to characteristics of the data packets comprises sorting the network traffic records according to source network addresses and destination network addresses contained in data packets, and wherein the alarm signal identified the data packet characteristic comprised of at least one source network address or destination network address.

8. A method as defined in claim 7, wherein the network traffic records are contained in one or more binary tree data structures containing nodes that each represent one or more network addresses.

9. A method as defined in claim 1, wherein the first network location includes a network router.

10. A network device for responding to a denial of service flooding attack against an end the network device comprising:

a network interface that permits the device to intercept data packets bound for the end-system;

a memory in which instructions and data are stored; and a processor, coupled to the memory, such that the processor receives the instructions stored in the memory and executes the instructions to perform operations for responding to a denial of service flooding attack, the operations comprising:

determining that data packets deemed responsible for a denial of service flooding condition have been received at the network device;

establishing a filter that prevents data packets deemed responsible for the denial of service flooding condition from being forwarded from the first network device;

monitoring a flow of data packets received at the first network device to determine whether the flow of data packets exhibits legitimate behavior, such that the flow of data packets that exhibits behavior is determined to originate from a legitimate source that is not responsible for the denial of service flooding condition; and modifying the filter to filter increasingly specific portions of network address space of the data packet source wherein a corresponding greater portion of the data packets that originate from a legitimate source are not filtered and are forwarded from the first network device.

11. A network device as defined in claim 10, wherein the network device comprises a network router.

12. A network device as defined in claim 10, wherein the network device is attached to a network router.

13. A network device as defined in claim 10, wherein the operations performed by the processor additionally comprise:

identifying at least one data packet characteristic such that data packets having the data packet characteristic are deemed to be responsible for the denial of service flooding condition;

transmitting an alarm signal to a second network location, the alarm signal identifying the data packet characteristic, wherein a device that receives the alarm signal can use the alarm signal to inhibit the data packets having the data packet characteristic from passing through the second network location.

14. A network device as defined in claim 10, wherein the device can receive an alarm signal that indicates that the denial of service flooding condition is present at a network location, the alarm signal identifying at least on characteristic of a data packet such that data packets with the characteristic are determined to be at least partially responsible for the denial of service flooding condition.

15. A program product for use in a computer network device that executes program steps recorded in a computer-readable media to perform a method of protecting against a computer network denial of service attack, the program product comprising:

a recordable media; and computer-readable instructions recorded on the recordable media comprising instructions executable by the computer to perform operations comprising:

determining that data packets deemed responsible for a denial of service flooding condition have been received at a first network location;

establishing a filter that prevents data packets deemed responsible for the denial of service flooding condition from being forwarded from the first network location;

monitoring a flow of data packets received at the first location to determine whether the flow of data packets exhibit legitimate behavior, such that the flow of data packets that exhibits legitimate behavior is determined to originate from a legitimate source that is not responsible for the denial of service flooding condition; and modifying the filter to filter increasingly specific portions of network address space of the data packet source wherein a corresponding greater portion of the data packets that originate from a legitimate source to be are not filtered and are forwarded from the first network location.

* * * * *